(12) United States Patent
Mignogna et al.

(10) Patent No.: US 9,034,783 B2
(45) Date of Patent: May 19, 2015

(54) CATALYST COMPONENTS FOR THE POLYMERIZATION OF OLEFINS

(75) Inventors: Alessandro Mignogna, Ferrara (IT); Davide Balboni, Ferrara (IT); Antonio Cristofori, Ferrara (IT); Simona Guidotti, Ferrara (IT); Giampiero Morini, Ferrara (IT); Joachim T. M. Pater, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/125,502

(22) PCT Filed: Jun. 15, 2012

(86) PCT No.: PCT/EP2012/061466
§ 371 (c)(1),
(2), (4) Date: Dec. 11, 2013

(87) PCT Pub. No.: WO2012/175425
PCT Pub. Date: Dec. 27, 2012

(65) Prior Publication Data
US 2014/0142262 A1 May 22, 2014

Related U.S. Application Data

(60) Provisional application No. 61/501,443, filed on Jun. 27, 2011.

(30) Foreign Application Priority Data

Jun. 24, 2011 (EP) .................................... 11171281

(51) Int. Cl.
| | | |
|---|---|---|
| B01J 37/00 | (2006.01) | |
| C08F 4/02 | (2006.01) | |
| C08F 4/60 | (2006.01) | |
| B01J 27/06 | (2006.01) | |
| C08F 4/44 | (2006.01) | |
| C08F 2/00 | (2006.01) | |
| C08F 4/50 | (2006.01) | |
| C08F 10/00 | (2006.01) | |
| C08F 4/16 | (2006.01) | |
| C08F 110/06 | (2006.01) | |

(52) U.S. Cl.
CPC . *C08F 4/50* (2013.01); *C08F 10/00* (2013.01); *C08F 110/06* (2013.01); *C08F 4/16* (2013.01)

(58) Field of Classification Search
CPC ............. B01J 37/00; B01J 27/06; C08F 4/02; C08F 4/60; C08F 4/44; C08F 4/06; C08F 2/00

USPC ........... 526/213, 125.2, 125.7, 135, 143, 144, 526/214; 502/125, 126, 127, 224
See application file for complete search history.

(56) References Cited

U.S. PATENT DOCUMENTS

| | | | |
|---|---|---|---|
| 4,563,436 A | 1/1986 | Yokoyama et al. | |
| 2012/0157295 A1* | 6/2012 | Chen et al. .................... | 502/107 |

FOREIGN PATENT DOCUMENTS

| | | |
|---|---|---|
| CN | 1986576 A | 6/2007 |
| WO | WO98/44009 A1 | 10/1998 |
| WO | WO03/068828 A1 | 8/2003 |
| WO | WO2012/087527 A1 | 6/2012 |
| WO | WO2012/087531 A1 | 6/2012 |

OTHER PUBLICATIONS

Solodovnikov. M. A. et al: "Effect of preparation conditions for polypropylene on its molecular weight distribution", XP002682489, STN, Database No. 1989:439929.
Maier. E. A. et al: "Effect of the method of synthesis on the properties of polypropylene", XP002682490, STN, Database No. 1989:96195.
PCT International Search Report & Written Opinion mailed Sep. 11, 2012, for PCT/EP2012/061466.

* cited by examiner

*Primary Examiner* — Fred M Teskin
*Assistant Examiner* — Elizabeth Eng

(57) ABSTRACT

Catalyst component for the polymerization of olefins comprising Mg, Ti and an electron donor compound of the following formula (I)

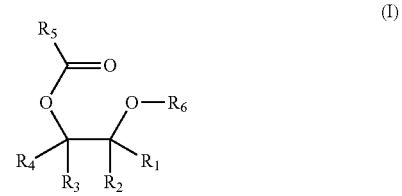

In which
$R_1$ to $R_4$ groups, equal to or different from each other, are hydrogen, $C_1$-$C_{15}$ hydrocarbon groups, optionally containing an heteroatom selected from halogen, P, S, N and Si, $R_6$ group is selected from $C_1$-$C_{15}$ hydrocarbon groups optionally containing an heteroatom selected from halogen, P, S, N and Si, and $R_5$ is selected from phenyl groups mono or poly substituted with halogens, said groups $R_1$-$R_4$ being also optionally linked to form a saturated or unsaturated mono or poly cycle.

11 Claims, No Drawings

CATALYST COMPONENTS FOR THE POLYMERIZATION OF OLEFINS

This application is the U.S. National Phase of PCT International Application PCT/EP2012/061466, filed Jun. 15, 2012, claiming priority of European Patent Application No. 11171281.6, filed Jun. 24, 2011, and the benefit under 35 U.S.C. 119(e) of U.S. Provisional Application No. 61/501,443 filed Jun. 27, 2011, the contents of which are incorporated herein by reference in their entirety.

FIELD OF THE INVENTION

The present invention relates to catalyst components for the polymerization of olefins, in particular propylene, comprising a Mg dihalide based support on which are supported Ti atoms and at least an electron donor selected from a specific class of electron donor compounds. The present invention further relates to the catalysts obtained from said components and to their use in processes for the polymerization of olefins in particular propylene.

BACKGROUND OF THE INVENTION

Catalyst components of the Ziegler-Natta type for the stereospecific polymerization of olefins are widely known in the art. The latest developed catalysts for propylene polymerization comprise a solid catalyst component, constituted by a magnesium dihalide on which are supported a titanium compound and an internal electron donor compound, used in combination with an Al-alkyl compound and often with an external donor which is needed in order to obtain higher isotacticity. One of the preferred classes of internal donors is constituted by the esters of phthalic acid, diisobutylphthalate being the most used. The phthalates are used as internal donors in combination with alkylalkoxysilanes as external donor. This catalyst system is capable of giving good performances in terms of activity, and propylene polymers with high isotacticity and xylene insolubility endowed with an intermediate molecular weight distribution.

Use of some phthalates however has been recently addressed as involving potential toxicity problems and therefore research activity have been devoted to find alternative classes of donor capable of replacing phthalates in terms of both performances and quality of the product.

One of the most interesting classes is that described in U.S. Pat. No. 7,388,061 disclosing esters belonging to the formula $R_1$—CO—O—$CR_3R_4$-A-$CR_5R_6$—O—CO—$R_2$ in which $R_1$ and $R_2$ groups, which may be identical or different, can be substituted or unsubstituted hydrocarbyl having 1 to 20 carbon atoms, $R_3$-$R_6$ groups, which may be identical or different, can be selected from the group consisting of hydrogen, halogen or substituted or unsubstituted hydrocarbyl having 1 to 20 carbon atoms, $R_1$-$R_6$ groups optionally contain one or more hetero-atoms replacing carbon, hydrogen atom or the both, said hetero-atom is selected from the group consisting of nitrogen, oxygen, sulfur, silicon, phosphorus and halogen atom, two or more of $R_3$-$R_6$ groups can be linked to form saturated or unsaturated monocyclic or polycyclic ring; A is a single bond or bivalent linking group with chain length between two free radicals being 1-10 atoms, wherein said bivalent linking group is selected from the group consisting of aliphatic, alicyclic and aromatic bivalent radicals, and can carry C1-C20 linear or branched substituents; one or more of carbon atoms and/or hydrogen atoms on above-mentioned bivalent linking group and substituents can be replaced by a hetero-atom selected from the group consisting of nitrogen, oxygen, sulfur, silicon, phosphorus, and halogen atom, and two or more said substituents on the linking group as well as above-mentioned $R_3$-$R_6$ groups can be linked to form saturated or unsaturated monocyclic or polycyclic ring.

The examples reported in the document seem to show in general, capability to produce polymers with a broad molecular weight distribution, with a polymerization activity and stereospecificity ranging from very poor (see example 68 and 86) to good performances. Looking at the result of table 1 the catalysts based on diesters of 1,2 diols (examples 1-4) seem in general endowed with an inferior activity/stereospecificity balance with respect to the catalysts based on diester of 1,3 diols. Moreover, by evaluating the series of examples 5, 9-12 and the series of examples 24-26 and 28 it clearly results that the presence of a substituent on the phenyl ring of the benzoic moiety of the donor worsen the catalyst performances particularly in terms of stereospecificity.

Derivatives of 1,2 diols in which one hydroxy group is esterified with a benzoic group and the other is etherified also do not seem very promising. WO2011/106500 describes the use of 1-methoxypropan-2-yl benzoate always in combination with amide esters acting as primary internal donors. The testing of a catalyst based on 1-methoxypropan-2-yl benzoate alone carried out by the applicant reported not completely satisfactory results.

Also not very satisfying results have been obtained by testing another monoether/monoester of 1,2 diol, namely 2-methoxyethyl benzoate. The use of this donor was described in CN101914172A for the preparation of a catalyst used for butene-1 polymerization. The poor results showed for butene-1 polymerization has been confirmed when tested for propylene polymerization. Based on the above it has been very surprising to see that it was possible to improve the class of monoethers/monoesters of 1,2 diols by a specific substitution of the phenyl ring of the benzoic moiety. Such modified structures in fact, can generate catalysts showing a so excellent balance of high stereospecificity and high activity to make them eligible as replacement of phthalate donors.

SUMMARY OF THE INVENTION

Accordingly, an object of the present invention is a catalyst component for the polymerization of olefins comprising Mg, Ti and an electron donor compound of the following formula (I)

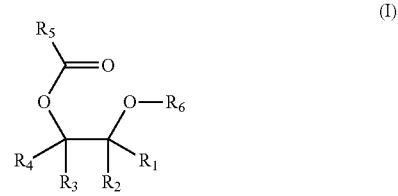

In which
$R_1$ to $R_4$ groups, equal to or different from each other, are hydrogen or $C_1$-$C_{15}$ hydrocarbon groups, optionally containing an heteroatom selected from halogen, P, S, N and Si, $R_6$ groups are selected from $C_1$-$C_{15}$ hydrocarbon groups optionally containing an heteroatom selected from halogen, P, S, N and Si, and $R_5$ is selected from phenyl groups mono or poly substituted with halogens, said groups $R_1$-$R_4$ being also optionally linked to form a saturated or unsaturated mono or poly cycle.

DETAILED DESCRIPTION OF THE INVENTION

Preferably, R1 to R4 groups are, independently, hydrogen or C1-C10 alkyl groups. More preferably R1 to R3 are hydrogen and R4 is a C1-C10 alkyl group.

Preferably, R6 groups are selected from C1-C10 alkyl groups and more preferably from C1-C6 alkyl groups. In an especially preferred embodiment, R4 is selected from C1-C6 linear or branched alkyl groups while R6 is preferably methyl. The R5 groups are preferably substituted in meta and/or para position. Preferred halogen substituents are Cl, Br and F with Cl being the most preferred. Once at least one halogen is present in said meta and/or para position one or more of the other available positions of the ring can contain other substituents selected from halogens and C1-C15 hydrocarbon groups. Among hydrocarbon groups C1-C10 alkyl groups, C3-C15 cycloalkyl groups, and C7-C15 arylalkyl or alkylaryl groups are preferred. In case of substitution with alkyl groups, substitution with C1-C5 linear alkyl groups is preferred. In case of further substitution with halogen Cl, Br and F are preferred with Cl being the most preferred.

Particularly preferred structures are those in which R4 is methyl and R5 is a phenyl group substituted with halogen in para position and those in which R4 is n-butyl and R5 is a phenyl group substituted with halogen in meta position.

For the sake of clarity it is specified that the terms "meta" and or "para" are to be determined with reference to the carbon atom of the phenyl ring linked carbonyl group of the formula (I).

As the electron donor of formula (I) may have a more or less pronounced tendency to give transterification products with alkoxy groups possibly present during preparation of the catalyst component it may be possible to retrieve in the solid catalyst component also electron donor compound of formula $R_5COOR_7$ where $R_5$ has the same meaning given above and $R_7$ is an alkyl group having from 1 to 10 carbon atoms preferably selected from ethyl, propyl, isopropyl, butyl, i-butyl, t-butyl, 2-ethyl-hexyl and n-octyl.

Non limiting examples of structures (II) are the following: 1-(benzyloxy)-3,3-dimethylbutan-2-yl 3-chlorobenzoate, 1-(benzyloxy)-3-methylbutan-2-yl 3-chlorobenzoate, 1-(benzyloxy)-3-phenylpropan-2-yl 3-chlorobenzoate, 1-(benzyloxy)-4-methylpentan-2-yl 3-chlorobenzoate, 1-(benzyloxy)butan-2-yl 3-chlorobenzoate, 1-(benzyloxy)hexan-2-yl 3-chlorobenzoate, 1-(benzyloxy)octan-2-yl 3-chlorobenzoate, 1-(benzyloxy)pentan-2-yl 3-chlorobenzoate, 1-(benzyloxy)propan-2-yl 3-chlorobenzoate, 1-butoxy-3,3-dimethylbutan-2-yl 3-chlorobenzoate, 1-butoxy-3-methylbutan-2-yl 3-chlorobenzoate, 1-butoxy-3-phenylpropan-2-yl 3-chlorobenzoate, 1-butoxy-4-methylpentan-2-yl 3-chlorobenzoate, 1-butoxybutan-2-yl 3-chlorobenzoate, 1-butoxyhexan-2-yl 3-chlorobenzoate, 1-butoxyoctan-2-yl 3-chlorobenzoate, 1-butoxypentan-2-yl 3-chlorobenzoate, 1-butoxypropan-2-yl 3-chlorobenzoate, 1-ethoxy-3,3-dimethylbutan-2-yl 3-chlorobenzoate, 1-ethoxy-3-methylbutan-2-yl 3-chlorobenzoate, 1-ethoxy-3-phenylpropan-2-yl 3-chlorobenzoate, 1-ethoxy-4-methylpentan-2-yl 3-chlorobenzoate, 1-ethoxybutan-2-yl 3-chlorobenzoate, 1-ethoxyhexan-2-yl 3-chlorobenzoate, 1-ethoxyoctan-2-yl 3-chlorobenzoate, 1-ethoxypentan-2-yl 3-chlorobenzoate, 1-ethoxypropan-2-yl 3-chlorobenzoate, 1-isobutoxy-3,3-dimethylbutan-2-yl 3-chlorobenzoate, 1-isobutoxy-3-methylbutan-2-yl 3-chlorobenzoate, 1-isobutoxy-3-phenylpropan-2-yl 3-chlorobenzoate, 1-isobutoxy-4-methylpentan-2-yl 3-chlorobenzoate, 1-isobutoxybutan-2-yl 3-chlorobenzoate, 1-isobutoxyhexan-2-yl 3-chlorobenzoate, 1-isobutoxyoctan-2-yl 3-chlorobenzoate, 1-isobutoxypentan-2-yl 3-chlorobenzoate, 1-isobutoxypropan-2-yl 3-chlorobenzoate, 1-methoxy-3,3-dimethylbutan-2-yl 3-chlorobenzoate, 1-methoxy-3-methylbutan-2-yl 3-chlorobenzoate, 1-methoxy-3-phenylpropan-2-yl 3-chlorobenzoate, 1-methoxy-4-methylpentan-2-yl 3-chlorobenzoate, 1-methoxybutan-2-yl 3-chlorobenzoate, 1-methoxyhexan-2-yl 3-chlorobenzoate, 1-methoxyoctan-2-yl 3-chlorobenzoate, 1-methoxypentan-2-yl 3-chlorobenzoate, 1-methoxypropan-2-yl 3-chlorobenzoate, 1-phenoxy-3-phenylpropan-2-yl 3-chlorobenzoate, 1-phenoxybutan-2-yl 3-chlorobenzoate, 1-phenoxyhexan-2-yl 3-chlorobenzoate, 1-phenoxyoctan-2-yl 3-chlorobenzoate, 1-phenoxypentan-2-yl 3-chlorobenzoate, 1-phenoxypropan-2-yl 3-chlorobenzoate, 1-phenyl-2-propoxyethyl 3-chlorobenzoate, 1-phenyl-3-propoxypropan-2-yl 3-chlorobenzoate, 1-propoxybutan-2-yl 3-chlorobenzoate, 1-propoxyhexan-2-yl 3-chlorobenzoate, 1-propoxyoctan-2-yl 3-chlorobenzoate, 1-propoxypentan-2-yl 3-chlorobenzoate, 1-propoxypropan-2-yl 3-chlorobenzoate, 2-(benzyloxy)-1-phenylethyl 3-chlorobenzoate, 2-(benzyloxy)ethyl 3-chlorobenzoate, 2-butoxy-1-phenylethyl 3-chlorobenzoate, 2-butoxyethyl 3-chlorobenzoate, 2-ethoxy-1-phenylethyl 3-chlorobenzoate, 2-ethoxyethyl 3-chlorobenzoate, 2-isobutoxy-1-phenylethyl 3-chlorobenzoate, 2-isobutoxyethyl 3-chlorobenzoate, 2-methoxy-1-phenylethyl 3-chlorobenzoate, 2-methoxyethyl 3-chlorobenzoate, 2-phenoxy-1-phenylethyl 3-chlorobenzoate, 2-phenoxyethyl 3-chlorobenzoate, 2-propoxyethyl 3-chlorobenzoate, 3,3-dimethyl-1-phenoxybutan-2-yl 3-chlorobenzoate, 3,3-dimethyl-1-propoxybutan-2-yl 3-chlorobenzoate, 3-methyl-1-phenoxybutan-2-yl 3-chlorobenzoate, 3-methyl-1-propoxybutan-2-yl 3-chlorobenzoate, 4-methyl-1-phenoxypentan-2-yl 3-chlorobenzoate, 4-methyl-1-propoxypentan-2-yl 3-chlorobenzoate, 1-methoxyhexan-2-yl 3,4-dibromobenzoate, 1-methoxyhexan-2-yl 3,4-dichlorobenzoate, 1-methoxyhexan-2-yl 3,4-difluorobenzoate, 1-methoxypropan-2-yl 3,4-dibromobenzoate, 1-methoxypropan-2-yl 3,4-dichlorobenzoate, 1-methoxypropan-2-yl 3,4-difluorobenzoate, 1-methoxypropan-2-yl 3-bromo-4-chlorobenzoate, 1-methoxyhexan-2-yl 4-bromobenzoate, 1-methoxyhexan-2-yl 4-fluorobenzoate, 1-methoxyhexan-2-yl 4-iodobenzoate, 1-methoxypropan-2-yl 4-bromobenzoate, 1-methoxypropan-2-yl 4-fluorobenzoate, 1-methoxypropan-2-yl 4-iodobenzoate, 2-methoxyphenyl 3-chlorobenzoate, 5-(tert-butyl)-2-methoxyphenyl 3-chlorobenzoate, 3,5-di-tert-butyl-2-methoxyphenyl 3-chlorobenzoate, 5-(tert-butyl)-2-methoxy-3-methylphenyl 3-chlorobenzoate, 3,5-diisopropyl-2-methoxyphenyl 3-chlorobenzoate, 1-methoxypropan-2-yl 4-chlorobenzoate, 1-methoxypropan-2-yl 3-bromobenzoate, 1-methoxypropan-2-yl 3,5-difluorobenzoate, 1-methoxyhexan-2-yl 4-chlorobenzoate, 1-methoxyhexan-2-yl 3,5-dichlorobenzoate, 1-methoxypropan-2-yl 3-iodobenzoate, 1-methoxypropan-2-yl 2,4-dichlorobenzoate, 2-methoxyethyl 3-chlorobenzoate.

As explained above, the catalyst components of the invention comprise, in addition to the above electron donors, Ti, Mg and halogen. In particular, the catalyst components comprise a titanium compound, having at least a Ti-halogen bond and the above mentioned electron donor compounds supported on a Mg halide. The magnesium halide is preferably $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{q-y}X_y$, can be used, where q is the valence of titanium, y is a number between 1 and q−1, X is halogen and R is a hydrocarbon radical having from 1 to 10 carbon atoms.

The preparation of the solid catalyst component can be carried out according to several methods.

According to one of these methods, the magnesium dichloride in an anhydrous state, the titanium compound and the electron donor compounds are milled together under conditions in which activation of the magnesium dichloride occurs. The so obtained product can be treated one or more times with an excess of TiCl4 at a temperature between 80 and 135° C. This treatment is followed by washings with hydrocarbon solvents until chloride ions disappeared. According to a further method, the product obtained by co-milling the magnesium chloride in an anhydrous state, the titanium compound and the electron donor compounds are treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. Another method comprises the reaction between magnesium alcoholates or chloroalcoholates (in particular chloroalcoholates prepared according to U.S. Pat. No. 4,220,554) and an excess of TiCl4 in the presence of the electron donor compounds at a temperature of about 80 to 120° C.

According to a preferred method, the solid catalyst component can be prepared by reacting a titanium compound of formula $Ti(OR)_{q-y}X_y$, where q is the valence of titanium and y is a number between 1 and q, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The electron donor compounds can be added in the desired ratios during the treatment with $TiCl_4$. The preparation of catalyst components in spherical form are described for example in European Patent Applications EP-A-395083, EP-A-553805, EP-A-553806, EPA601525 and WO98/44001.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10.000 Å generally ranges from 0.3 to 1.5 $cm^3/g$, preferably from 0.45 to 1 $cm^3/g$.

The solid catalyst component has an average particle size ranging from 5 to 120 μm and more preferably from 10 to 100 μm.

As mentioned, in any of these preparation methods the desired electron donor compounds can be added as such or, in an alternative way, can be obtained in situ by using an appropriate precursor capable of being transformed in the desired electron donor compound by means, for example, of known chemical reactions such as etherification, alkylation, esterification, transesterification etc.

Regardless of the preparation method used, the final amount of the electron donor compound of formula (I) is such that its molar ratio with respect to the $MgCl_2$ is from 0.01 to 1, preferably from 0.05 to 0.5.

The solid catalyst components according to the present invention are converted into catalysts for the polymerization of olefins by reacting them with organoaluminum compounds according to known methods.

In particular, an object of the present invention is a catalyst for the polymerization of olefins $CH_2$=CHR, in which R is hydrogen or a hydrocarbyl radical with 1-12 carbon atoms, comprising the product obtained by contacting:
 (i) the solid catalyst component as disclosed above and
 (ii) an alkylaluminum compound.

The alkyl-Al compound (ii) is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as $AlEt_2Cl$ and $Al_2Et_3Cl_3$, possibly in mixture with the above cited trialkylaluminums.

Suitable external electron-donor compounds include silicon compounds, ethers, esters, amines, heterocyclic compounds and particularly 2,2,6,6-tetramethylpiperidine and ketones.

Another class of preferred external donor compounds is that of silicon compounds of formula $(R_6)_a(R_7)_bSi(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms. Particularly preferred are the silicon compounds in which a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group, in particular methyl. Examples of such preferred silicon compounds are methylcyclohexyldimethoxysilane (C donor), diphenyldimethoxysilane, methyl-t-butyldimethoxysilane, dicyclopentyldimethoxysilane (D donor), (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl(3,3,3-trifluoro-n-propyl)dimethoxysilane. Moreover, the silicon compounds in which a is 0, c is 3, $R_7$ is a branched alkyl or cycloalkyl group, optionally containing heteroatoms, and $R_8$ is methyl are also preferred. Examples of such preferred silicon compounds are cyclohexyltrimethoxysilane, t-butyltrimethoxysilane and thexyltrimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100.

Therefore, it constitutes a further object of the present invention a process for the (co)polymerization of olefins $CH_2$=CHR, in which R is hydrogen or a hydrocarbyl radical with 1-12 carbon atoms, carried out in the presence of a catalyst comprising the product of the reaction between:
(i) the solid catalyst component of the invention;
(ii) an alkylaluminum compound and,
(iii) optionally an electron-donor compound (external donor).

The polymerization process can be carried out according to known techniques for example slurry polymerization using as diluent an inert hydrocarbon solvent, or bulk polymerization using the liquid monomer (for example propylene) as a reaction medium. Moreover, it is possible to carry out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 5 MPa, preferably between 1 and 4 MPa. In the bulk polymerization the operating pressure is generally between 1 and 8 MPa, preferably between 1.5 and 5 MPa.

The following examples are given in order to better illustrate the invention without limiting it.

EXAMPLES

Characterizations

Determination of Ti

The determination of Ti content in the solid catalyst component has been carried out via inductively coupled plasma emission spectroscopy on "I.C.P Spectrometer ARL Accuris".

The sample was prepared by analytically weighting, in a "fluxy platinum crucible", 0.1÷0.3 grams of catalyst and 3 grams of lithium metaborate/tetraborate 1/1 mixture. The crucible is placed on a weak Bunsen flame for the burning step and then after addition of some drops of KI solution inserted in a special apparatus "Claisse Fluxy" for the complete burning. The residue is collected with a 5% v/v HNO3 solution and then the titanium was analyzed via ICP at a wavelength of 368.52 nm.

Determination of Internal Donor Content

The determination of the content of internal donor in the solid catalytic compound was done through gas chromatography. The solid component was dissolved in water. The solution was extracted with ethyl acetate, an internal standard was added, and a sample of the organic phase was analyzed in a gas chromatograph, to determine the amount of donor present at the starting catalyst compound.

Determination of X.I 2.5 g of polymer and 250 ml of o-xylene were placed in a round-bottomed flask provided with a cooler and a reflux condenser and kept under nitrogen. The obtained mixture was heated to 135° C. and was kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of said xylene-soluble fraction is expressed as a percentage of the original 2.5 grams and then, by difference, the X.I. %.

Melt Flow Rate (MFR)

The melt flow rate MIL of the polymer was determined according to ISO 1133 (230° C., 2.16 Kg)

Procedure for Preparation of the Spherical Adduct

An initial amount of microspheroidal $MgCl_2 \cdot 2.8C_2H_5OH$ was prepared according to the method described in Example 2 of WO98/44009, but operating on larger scale. The support adduct had a P50 of about 25 micron, and an ethanol content of about 56% wt.

General Procedure for the Preparation of the Solid Catalyst Component

Into a 500 ml round bottom flask, equipped with mechanical stirrer, cooler and thermometer 250 ml of $TiCl_4$ were introduced at room temperature under nitrogen atmosphere. After cooling to 0° C., while stirring, the internal donor and 10.0 g of the spherical adduct (prepared as described above) were sequentially added into the flask. The amount of charged internal donor was such to charge a Mg/donor molar ratio of 6. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again, the solid was allowed to settle and the supernatant liquid was siphoned off.

The solid was washed with anhydrous hexane six times (6×100 ml) in temperature gradient down to 60° C. and one time (100 ml) at room temperature. The obtained solid was then dried under vacuum and analyzed. The measured composition of the solid is depicted in Table 1.

General Procedure for the Polymerization of Propylene

A 4-liter steel autoclave equipped with a stirrer, pressure gauge, thermometer, catalyst feeding system, monomer feeding lines and thermostating jacket, was purged with nitrogen flow at 70° C. for one hour. Then, at 30° C. under propylene flow, were charged in sequence with 75 ml of anhydrous hexane, 0.76 g of $AlEt_3$, 0.076 g of dicyclopentyldimethoxysilane (D donor) and 0.006÷0.010 g of solid catalyst component. The autoclave was closed; subsequently 2.0 Nl of hydrogen were added. Then, under stirring, 1.2 kg of liquid propylene was fed. The temperature was raised to 70° C. in five minutes and the polymerization was carried out at this temperature for two hours. At the end of the polymerization, the non-reacted propylene was removed; the polymer was recovered and dried at 70° C. under vacuum for three hours. Then the polymer was weighed and fractionated with o-xylene to determine the amount of the xylene insoluble (X.I.) fraction.

Examples 1-20, and Comparative Examples 1-7

Various donors were used in the preparation of the solid catalyst component, following the description given above. The donors used are listed in Table 1.

The thus obtained solid catalyst components were analyzed for their composition, and were tested in polymerization of propylene, using the method described above. The titanium and internal donor content of the solid catalyst components, and their performance in polymerization are also shown in Table 1.

TABLE 1

Composition and performance of exemplified catalysts

| Ex. | Internal donor Name | % wt | Ti wt % | Mileage kg/g | XI wt % | MIL g/10' |
|---|---|---|---|---|---|---|
| 1 | 1-methoxybutan-2-yl 3-chlorobenzoate | 10.2 | 3.7 | 63 | 96.9 | 5.9 |
| 2 | 1-methoxyhexan-2-yl 3-chlorobenzoate | 11.6 | 3.5 | 71 | 97.3 | 2.2 |
| 3 | 1-methoxy-4-methylpentan-2-yl 3-chlorobenzoate | 13.2 | 3.8 | 49 | 96.5 | 4.6 |
| 4 | 1-methoxypropan-2-yl 3,5-difluorobenzoate | 10.6 | 3.3 | 51 | 97.1 | 6.7 |
| 5 | 1-methoxyoctan-2-yl 3-chlorobenzoate | 13.4 | 3.5 | 78 | 96.7 | 4.6 |
| 6 | 1-methoxypropan-2-yl 4-fluorobenzoate | 7.4 | 3.7 | 53 | 96.6 | 3.6 |
| 7 | 2-methoxyethyl 3-chlorobenzoate | 8.4 | 3 | 41 | 95.5 | 8.2 |
| 8 | 1-methoxypropan-2-yl 4-bromobenzoate | 10.7 | 3.6 | 49 | 97.1 | 5.8 |
| 9 | 1-methoxypropan-2-yl 3-chlorobenzoate | 8.6 | 3.5 | 69 | 97.4 | 4.2 |
| 10 | 1-methoxypropan-2-yl 3-bromobenzoate | 10.8 | 3.6 | 54 | 97.3 | 5 |
| 11 | 1-methoxyhexan-2-yl 3,4-dichlorobenzoate | 14.4 | 3.6 | 77 | 96.6 | 3.2 |
| 12 | 1-methoxypropan-2-yl 4-chlorobenzoate | 9.4 | 3.7 | 58 | 97.9 | 4.4 |
| 13 | 1-methoxy-3-methylbutan-2-yl 3-chlorobenzoate | 11.4 | 3.3 | 56 | 96.1 | 5.1 |
| 14 | 1-methoxyhexan-2-yl 3,5-dichlorobenzoate | 14.8 | 3.4 | 65 | 96.4 | 4.6 |
| 15 | 1-methoxypropan-2-yl 3-iodobenzoate | 11.8 | 3.6 | 48 | 96.2 | 5.1 |
| 16 | 1-methoxypropan-2-yl 3,4-difluorobenzoate | 12.5 | 3.5 | 69 | 97.7 | 4.5 |
| 17 | 1-methoxyhexan-2-yl 4-chlorobenzoate | 11.9 | 3.7 | 58 | 96.8 | 3 |
| 18 | 1-methoxypentan-2-yl 3-chlorobenzoate | 10.9 | 3.6 | 77 | 96.7 | 3.9 |
| 19 | 1-methoxypropan-2-yl 2,4-dichlorobenzoate | N.D. | 3.8 | 61 | 96.1 | 5 |
| 20 | 1-methoxypropan-2-yl 3,4-dichlorobenzoate | 15.1 | 3.8 | 71 | 97.8 | 4.4 |
| C1 | 1-methoxypropan-2-yl benzoate | 4.6 | 4.2 | 52 | 95.8 | 2.7 |
| C2 | 1-methoxyhexan-2-yl benzoate | 5.9 | 4.3 | 66 | 95.1 | 9.4 |
| C3 | 1-methoxypropan-2-yl 4-propylbenzoate | 3.1 | 4.9 | 64 | 95.2 | 7.7 |
| C4 | 1-methoxypropan-2-yl 4-(tert-butyl)benzoate | 2.8 | 4.5 | 51 | 95.4 | 5.8 |
| C 5 | propane-1,2-diyl dibenzoate | N.D. | 3.9 | 17 | 94.2 | 3.7 |
| C 6 | 1-methoxypropan-2-yl 3-methylbutanoate | 1.6 | 5.2 | 52 | 92.4 | 7.5 |
| C7 | 2-methoxyethyl benzoate | N.D. | 3.6 | 39 | 94.7 | 8.8 |

N.D. no data

What is claimed is:

1. A catalyst component for the polymerization of olefins comprising Mg, Ti and an electron donor compound of the following formula (I)

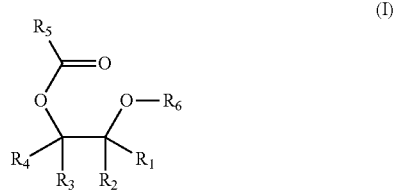

wherein
R$_1$ is a C$_1$-C$_{15}$ hydrocarbon group, optionally containing a heteroatom selected from halogen, P, S, N and Si,
R$_2$ to R$_4$, equal to or different from each other, are hydrogen, C$_1$-C$_{15}$ hydrocarbon groups, optionally containing a heteroatom selected from halogen, P, S, N and Si, R$_6$ is selected from C$_1$-C$_{15}$ hydrocarbon groups optionally containing a heteroatom selected from halogen, P, S, N and Si, and R$_5$ is selected from phenyl groups that are mono or poly substituted with halogens, said groups R$_2$-R$_4$ being also optionally linked to form a saturated or unsaturated mono or poly cycle.

2. The catalyst component of claim 1, wherein R$_2$ to R$_4$ are, independently, hydrogen or C$_1$-C$_{10}$ alkyl groups, and R$_1$ is a C$_1$-C$_{10}$ alkyl group.

3. The catalyst component of claim 1, wherein R$_4$ and R$_6$ are selected from C$_1$-C$_{10}$ alkyl groups.

4. The catalyst component of claim 3, wherein R$_4$ is selected from C$_1$-C$_6$ linear or branched alkyl groups and R$_6$ is methyl.

5. The catalyst component of claim 1, wherein R$_5$ is substituted in meta and/or para position.

6. The catalyst component of claim 5, wherein the halogen is selected from Cl, Br and F.

7. The catalyst component of claim 6, wherein the halogen is Cl.

8. The catalyst component of claim 1, wherein R$_4$ is methyl and R$_5$ is a phenyl group substituted with halogen in para position.

9. The catalyst component of claim 1, wherein R$_4$ is n-butyl and R$_5$ is a phenyl group substituted with halogen in meta position.

10. A catalyst for the (co)polymerization of olefins CH$_2$=CHR, in which R is hydrogen or a hydrocarbyl radical with 1-12 carbon atoms, comprising the product obtained by contacting:
  (i) the solid catalyst component according to claim 1;
  (ii) an alkylaluminum compound and,
  (iii) optionally an external electron-donor compound.

11. A process for the (co)polymerization of olefins carried out in the presence of the catalyst according to claim 10.

* * * * *